(12) United States Patent
Arbesman et al.

(10) Patent No.: US 11,198,170 B2
(45) Date of Patent: Dec. 14, 2021

(54) BULK TEXTURED MATERIAL SHEETING

(71) Applicant: Gripmetal Limited, Dublin (IE)

(72) Inventors: Ray Arbesman, Toronto (CA); Nghi Pham, Concord (CA); Winston MacKelvie, Knowlton (CA)

(73) Assignee: Gripmetal Limited, Dublin (IE)

( * ) Notice: Subject to any disclaimer, the term of this patent is extended or adjusted under 35 U.S.C. 154(b) by 100 days.

(21) Appl. No.: 16/410,565

(22) Filed: May 13, 2019

(65) Prior Publication Data

US 2019/0329313 A1 Oct. 31, 2019

Related U.S. Application Data

(60) Division of application No. 15/259,433, filed on Sep. 8, 2016, now Pat. No. 10,335,847, which is a
(Continued)

(30) Foreign Application Priority Data

May 29, 2012 (CA) .................................. CA 2778455

(51) Int. Cl.
*B21D 31/02* (2006.01)
*B65H 35/00* (2006.01)
(Continued)

(52) U.S. Cl.
CPC ............. *B21D 31/02* (2013.01); *B21D 28/10* (2013.01); *B21J 5/068* (2020.08); *B29C 59/02* (2013.01);
(Continued)

(58) Field of Classification Search
CPC .......... B21D 31/02; B21D 28/10; B21J 5/068; B29C 59/02; B29C 59/022;
(Continued)

(56) References Cited

U.S. PATENT DOCUMENTS 1,897,088 A 2/1933 Victor et al.
1,915,221 A 6/1933 Fitzgerald et al.
(Continued)

FOREIGN PATENT DOCUMENTS

CA 1330521 C 7/1994
CA 1337622 C 11/1995
(Continued)

OTHER PUBLICATIONS

European Office Action for Application No. 13798052.0, dated Jun. 9, 2020, 4 pgs.
(Continued)

*Primary Examiner* — Christopher J Besler
(74) *Attorney, Agent, or Firm* — Brooks Kushman P.C.

(57) ABSTRACT

A material including a metal sheet, a first plurality of raised and pointed structures, and a second plurality of raised and pointed structures is provided. The metal sheet includes first and second opposed sides, and a thickness between the first and second opposed sides. The first plurality of raised and pointed structures are gouged out of the first side of the metal sheet. The sheet is not perforated, and the raised and pointed structures of the first plurality have a height of between 150% and 300% of the thickness. The second plurality of raised and pointed structures are gouged out of the second side of the metal sheet.

13 Claims, 4 Drawing Sheets

Related U.S. Application Data continuation of application No. 14/553,741, filed on Nov. 25, 2014, now Pat. No. 9,463,502, which is a continuation of application No. PCT/CA2013/000500, filed on May 23, 2013.

(51) Int. Cl.

| | | |
|---|---|---|
| *B21J 5/06* | (2006.01) | |
| *B21D 28/10* | (2006.01) | |
| *B29C 59/02* | (2006.01) | |
| *B29K 105/00* | (2006.01) | |

(52) U.S. Cl.
CPC ....... *B29C 59/022* (2013.01); *B65H 35/0006* (2013.01); *B29K 2105/256* (2013.01); *Y10T 29/49826* (2015.01); *Y10T 29/49833* (2015.01); *Y10T 29/49835* (2015.01); *Y10T 428/24355* (2015.01)

(58) Field of Classification Search
CPC ................ B65H 35/0006; B65H 37/00; Y10T 428/24355; Y10T 29/49835; Y10T 29/49826; Y10T 29/49833; B29K 2105/256
See application file for complete search history.

(56) References Cited

U.S. PATENT DOCUMENTS

| | | |
|---|---|---|
| 2,171,530 A | 9/1939 | Balfe et al. |
| 2,255,268 A | 9/1941 | Perrine |
| 2,781,097 A | 2/1957 | Nold et al. |
| 3,092,532 A | 6/1963 | Swick et al. |
| 3,134,152 A | 5/1964 | Pei |
| 3,170,354 A | 2/1965 | Scholl et al. |
| 3,533,891 A | 10/1970 | Wallace et al. |
| 3,551,232 A | 12/1970 | Thompson et al. |
| 3,557,407 A | 1/1971 | Lemelson |
| 3,605,360 A | 9/1971 | Lindal |
| 3,615,994 A | 10/1971 | Ian et al. |
| 3,677,055 A | 7/1972 | Longhi |
| 4,023,613 A | 5/1977 | Uebayasi et al. |
| 4,234,638 A | 11/1980 | Yamazoe et al. |
| 4,552,252 A | 11/1985 | Stahl et al. |
| 4,569,424 A | 2/1986 | Taylor et al. |
| 4,640,390 A | 2/1987 | Saumweber et al. |
| 4,705,278 A | 11/1987 | Locacius et al. |
| 4,723,783 A | 2/1988 | Larsen et al. |
| 4,776,602 A | 10/1988 | Gallo et al. |
| 4,781,389 A | 11/1988 | Beyer et al. |
| 4,815,172 A | 3/1989 | Ward et al. |
| 4,911,972 A | 3/1990 | Mercuri et al. |
| 4,939,818 A | 7/1990 | Hahn et al. |
| 5,067,210 A | 11/1991 | Kayaki |
| 5,142,743 A | 9/1992 | Hahn et al. |
| 5,143,184 A | 9/1992 | Snyder et al. |
| 5,172,920 A | 12/1992 | Schlenk |
| 5,362,074 A | 11/1994 | Gallo et al. |
| 5,376,410 A | 12/1994 | MacKelvie et al. |
| 5,469,604 A | 11/1995 | Calmettes et al. |
| D374,609 S | 10/1996 | Akeno |
| D376,533 S | 12/1996 | Akeno |
| 5,611,122 A | 3/1997 | Torigoe et al. |
| 5,788,247 A | 8/1998 | Tensor et al. |
| D400,427 S | 11/1998 | Okawa et al. |
| 5,842,546 A | 12/1998 | Biswas et al. |
| 5,896,629 A | 4/1999 | Van Hooreweder |
| D425,405 S | 5/2000 | Naohara et al. |
| 6,247,704 B1 | 6/2001 | Battistoni et al. |
| 6,258,457 B1 | 7/2001 | Roemmler et al. |
| 6,276,045 B1 | 8/2001 | Paikert et al. |
| 6,279,222 B1 | 8/2001 | Denton et al. |
| 6,431,331 B1 | 8/2002 | Arbesman et al. |
| 6,464,047 B1 | 10/2002 | Arbesman |
| 6,622,346 B2 | 9/2003 | Graham et al. |
| 6,671,935 B2 | 1/2004 | Filion et al. |
| 6,843,095 B2 | 1/2005 | Arbesman |
| 6,860,368 B2 | 3/2005 | Kulis et al. |
| 6,910,255 B2 | 6/2005 | Arbesman |
| 6,913,673 B2 | 7/2005 | Baggot et al. |
| 7,048,097 B2 | 5/2006 | Arbesman |
| 7,222,701 B2 | 5/2007 | Pham et al. |
| 7,320,386 B2 | 1/2008 | Kulis et al. |
| 7,686,142 B2 | 3/2010 | Jung |
| 7,841,052 B2 | 11/2010 | Ducauchuis |
| 7,989,049 B2 | 8/2011 | Potier |
| 8,048,507 B2 | 11/2011 | Shepard et al. |
| 8,088,316 B2 | 1/2012 | Muth et al. |
| D654,355 S | 2/2012 | Cheng |
| 8,407,864 B2 | 4/2013 | Mask et al. |
| 8,683,840 B2 | 4/2014 | Tuma et al. |
| 8,685,520 B2 | 4/2014 | Meyer et al. |
| 9,463,502 B2 | 10/2016 | Arbesman et al. |
| 2001/0001088 A1 | 5/2001 | Chesley et al. |
| 2002/0169435 A1 | 11/2002 | Neeb et al. |
| 2002/0170789 A1 | 11/2002 | Poelemans et al. |
| 2003/0037499 A1* | 2/2003 | Coulton ............ E04B 1/7612 52/302.3 |
| 2003/0111169 A1 | 6/2003 | Baggot et al. |
| 2004/0016608 A1 | 1/2004 | Gutowski |
| 2004/0140165 A1 | 7/2004 | Pham et al. |
| 2005/0170157 A1 | 8/2005 | Armela et al. |
| 2006/0027427 A1 | 2/2006 | Anda et al. |
| 2006/0087053 A1 | 4/2006 | O'Donnell et al. |
| 2006/0118238 A1 | 6/2006 | Borazghi |
| 2006/0243017 A1 | 11/2006 | Jung et al. |
| 2006/0246256 A1 | 11/2006 | Ausen et al. |
| 2008/0003401 A1 | 1/2008 | Barnes et al. |
| 2008/0014408 A1 | 1/2008 | Muth et al. |
| 2008/0217809 A1 | 9/2008 | Zhao et al. |
| 2009/0223753 A1 | 9/2009 | Kappagantu et al. |
| 2010/0170758 A1 | 7/2010 | Chen et al. |
| 2010/0207334 A1 | 8/2010 | Virgin et al. |
| 2011/0051724 A1 | 3/2011 | Scott et al. |
| 2011/0079065 A1 | 4/2011 | Cabanski et al. |
| 2011/0233875 A1 | 9/2011 | Shaver et al. |
| 2011/0260371 A1 | 10/2011 | Arora et al. |
| 2012/0003462 A1 | 1/2012 | Wong et al. |
| 2012/0006959 A1 | 1/2012 | Braun et al. |
| 2013/0152654 A1 | 6/2013 | Arbesman et al. |
| 2015/0053517 A1 | 2/2015 | Arbesman et al. |
| 2015/0086750 A1 | 3/2015 | Arbesman et al. |
| 2015/0099093 A1 | 4/2015 | Arbesman et al. |

FOREIGN PATENT DOCUMENTS

| | | |
|---|---|---|
| CA | 2127339 A1 | 1/1996 |
| CA | 2272115 A1 | 11/1999 |
| CA | 2391183 A1 | 12/2003 |
| CA | 2778455 A1 | 11/2013 |
| CA | 2780397 A1 | 12/2013 |
| CA | 2798303 A1 | 6/2014 |
| CA | 2821897 A1 | 1/2015 |
| CN | 1522190 A | 8/2004 |
| CN | 1286625 C | 11/2006 |
| CN | 102272471 A | 12/2011 |
| DE | 19754740 A1 | 3/1999 |
| DE | 102004048464 A1 | 4/2006 |
| DE | 102006015100 A1 | 10/2007 |
| DE | 102006015145 A1 | 10/2007 |
| DE | 102006015148 A1 | 10/2007 |
| EP | 859163 A1 | 8/1998 |
| EP | 0934820 A2 | 8/1999 |
| GB | 2125126 A | 2/1984 |
| GB | 2359186 A | 8/2001 |
| GB | 2507128 A | 4/2014 |
| JP | 48072067 | 9/1973 |
| JP | 49126532 | 12/1974 |
| JP | 05285561 | 11/1993 |
| JP | 8021462 A | 1/1996 |
| JP | 11309524 A | 11/1999 |
| JP | 2001001058 | 1/2001 |
| JP | 2002537527 | 11/2002 |

(56) References Cited

FOREIGN PATENT DOCUMENTS

| JP | 2003154423 | | 5/2003 |
|----|------------|---|--------|
| JP | 2013089799 | A | 5/2013 |
| WO | 0049308 | A1 | 8/2000 |
| WO | 2010105017 | A1 | 9/2010 |
| WO | 2011051724 | A2 | 5/2011 |
| WO | 2013177667 | A1 | 12/2013 |
| WO | 2015010183 | A1 | 1/2015 |

OTHER PUBLICATIONS

Extended European Search Report for Application No. 13798052.0, dated Jan. 21, 2016, 8 pgs.
Chinese Office Action and English Translation for Application No. 201380027691.8, dated Feb. 1, 2016, 15 pgs.
English Translation of Japanese Search Report for Application No. 2015-514294, dated Mar. 17, 2017, 12 pgs.
Chinese Office Action and English Translation for Application No. 201611205540.9, dated Feb. 14, 2018, 14 pgs.
"Graphite Sheet Gaskets", Environmental Gasket Company LTD., copyright 2009, 2009, 5 pages.
"Tanged Metal Reinforced Graphite Gasket data sheet", Ningbo Sunwell Fluid Technologies Co., Ltd., 2010, 1 page.
Japanese Application No. JP2015-514294, "Office Action", dated Apr. 4, 2017, 3 pages.
PCT/CA2013/000500, "International Preliminary Report on Patentability", dated Dec. 11, 2014, 6 pages.
PCT/CA2013/000500, "International Search Report and Written Opinion", dated Aug. 28, 2013, 7 pages.
U.S. Appl. No. 14/553,741, "Advisory Action", dated May 16, 2016, 4 pages.
U.S. Appl. No. 14/553,741, "Final Office Action", dated Jan. 22, 2016, 8 pages.
U.S. Appl. No. 14/553,741, "Non-Final Office Action", dated Aug. 10, 2015, 10 pages.
U.S. Appl. No. 14/553,741, "Notice of Allowance", dated Jun. 20, 2016, 2 pages.
U.S. Appl. No. 14/553,741, "Notice of Allowance", dated Jun. 8, 2016, 5 pages.
U.S. Appl. No. 14/553,741, "Restriction Requirement", dated Apr. 6, 2015, 7 pages.
"Graphite Sheet with Tanged Metal data sheet", Cixi CAZseal Packing & Gasket Co. Ltd., 1 page.
"SL T-20 Tang Sheet Specifications Datasheet", Dynoteq Kft, 1 page.
"Specification Sheet: SPG7003", SPG Gaskets Co., 1 page.
"Supagraf Expanded Graphite Jointings data sheet", James Walker & Co., 1 page.
"Tanged Graphite Datasheet", Alba Gaskets-Tanged Graphite Data I specification sheet, 1 page.
"Tanged Stainless Steel Reinforced Graphite Sheet data sheet", Gee Graphite, 1 page.

\* cited by examiner

BULK TEXTURED MATERIAL SHEETING

CROSS-REFERENCE TO RELATED APPLICATIONS

This application is a division of U.S. application Ser. No. 15/259,433, filed Sep. 8, 2016, now U.S. Pat. No. 10,335,847, issued Jul. 2, 2019, which is a continuation of Ser. No. 14/553,741, filed Nov. 25, 2014, now U.S. Pat. No. 9,463,502, issued Oct. 11, 2016, which is a continuation of PCT Application No. PCT/CA2013/000500, filed May 23, 2013, which claims the priority benefit of Canadian Patent Application No. 2,778,455, filed May 29, 2012, the disclosures of which are hereby incorporated in their entirety by reference herein.

FIELD OF THE INVENTION

The invention relates to material surface texturing, and more specifically relates to processes for making bulk textured material sheeting.

BACKGROUND OF THE INVENTION

Laminates are popular in various applications (e.g. building materials, panels for automotive applications, large scale industrial parts). In making laminated materials, it is common to use adhesive to join the lamina. However, adhesives have many known deficiencies. They are expensive, messy and emit noxious fumes. Many typical adhesives used for laminating heterogeneous materials are also prone to failure or shattering/cracking under various stresses (temperature, bending, cutting). Further, adhesives are undesirable from an environmental point of view as they foul the underlying materials and prevent recycling or reclamation of the lamina. It would be desirable to avoid the use of adhesive without compromising the strength of the laminate.

Mechanical attachment in individual parts (e.g. brake backing plate to friction material) has become known and highly successful, but the process is used on relatively thick steel in heavy individual plates, not on a continuous larger scale material that could be used for making adhesive-less laminated materials, including laminates of thinner materials.

Further, at present, individual parts are limited in terms of the size and shape variations that are possible. In order to provide mechanical attachment on individual parts, the blanks are typically fed from a magazine in which they all must be of a uniform size and outline. This is not convenient for larger scale applications, or one-off sizes, or custom lengths, which may be desirable for use in building materials, in particular.

It would be desirable to have a continuous process for preparing a textured (mechanical-attachment-ready) surface on bulk material.

SUMMARY OF THE INVENTION

A process is provided for making bulk textured material sheeting. As a continuous supply of flat material sheeting is fed, the sheeting is repeatedly impacted with toothed knives, each knife creating a row of raised and generally pointed structures on the sheeting to texture the sheeting. Preferably, the knives are actuated generally downward and across the sheeting to gouge the pointed structures out of the sheeting. The pointed structures may have a tilted or hooked shape. The hook, in one embodiment, is curled or twisted from the axis of its row. The hook shape is determined by the shape of the teeth on the knives, and the knives' path of travel. Preferably, no further (secondary) operation is needed to produce the hooked shape.

Preferably, the knives are arranged such that the knives are capable of forming a continuous row of pointed structures substantially spanning the width of the sheeting. Preferably, a single knife is capable of forming a continuous row of pointed structures substantially spanning the width of the sheeting. Preferably, the knives are arranged in one or more packs to form several rows of pointed structures in a single impact or stroke.

The process may include detecting an end of the supply and stopping the impact operation.

Preferably, the rows are formed substantially without gaps along the entire length of the sheet. Various patterns, arrangements, densities and dimensions of projections are possible. In one embodiment, each pointed structure has a finished height of less than 0.0100". The pointed structure dimensions may be based on a tiered scale of hook grades for different applications, such as:

Super-max. hook height 0.070"
Regular-max. hook height 0.060"
Mini-max. hook height 0.045"
Micro-max. hook height 0.030"

Preferably, in this embodiment, each pointed structure has a finished thickness at its base of less than 0.050", and more preferably, less than 0.040". Preferably, in this embodiment, each pointed structure has a finished height between about 150% to about 300% of the thickness of the sheeting (and not higher than the maximum height of each type of hook as appropriate). Preferably, in this embodiment, the density of pointed structures on the sheeting is between approximately 30-200 pointed structures per square inch, or more preferably, approximately 40 hooks per square inch for Super and Regular; 80 hooks per square inch for Mini; 190 hooks per square inch for Micro. Nonetheless, a great variety of dimensions and geometries of hooks are possible. Further, the hooks need not be provided in precisely matching rows over the entire material, but may be formed in zones or patterns to suit a particular application.

A two-sided process is also possible, in which the impact of the knives causes pointed structures to be formed on both sides of the sheeting.

Various post-texturing steps are possible. The textured sheeting may be simply taken up in a coil after the impacting step. The textured sheeting may be cut into lengths or strips after the impacting step. The textured sheeting may be fed directly to a joining station for joining the textured sheeting to another material. Other forming and shaping options exist. For instance, the textured sheeting may be roll-formed or bent to make tubes (round or otherwise), or channels, corners or other shapes.

Various end-products are possible from the textured sheeting material, coiled material, textured material pieces, joined material composite/laminate, shaped, rolled or bent material sheeting pieces or lengths.

The mechanical attachment allows heterogeneous materials to be joined in a laminate thereby combining and enhancing the properties of each material (e.g. adding strength or stiffness from a thin metal backing to a plastic, rubbery, or brittle top layer). This can also be used to make very strong, lightweight materials, as the individual components can be very thin, but the overall assembled structure has considerable strength due to the locking power of the embedded hooks that prevents the material from easily flexing or bending. This can also reduce the need for expensive or exotic materials as the properties of two or more possibly lower-grade (or recycled) materials can be easily combined to have more desirable characteristics. The laminated material itself can also be formed and stamped, preferably by first heating to at least partially soften any non-metallic lamina.

Textured bulk material may have other uses besides making laminated end products. The material may be used on its own as a cut-to-length construction material where the textured surface provides an anti-skid or attachment-ready surface (e.g. to receive a bulk second layer at the point of installation). Hooks on the surface provide a useful surface texture to receive and grab materials (e.g. fibrous materials where the hooks both embed and trap fibres thereof).

Thin straps of the material may also be used like a tape for bundling or securing loose or weak materials (the hooks are readily embedded by pressing the strap into and around the bundle or material to "stick" it together and secure it).

DETAILED DESCRIPTION

A process is provided for making bulk textured material sheeting. As a continuous supply of flat, material sheeting is fed, the sheeting is repeatedly impacted with toothed knives, each knife creating a row of raised and generally pointed (nail-like) structures on the sheeting to texture the sheeting.

Figure 1:
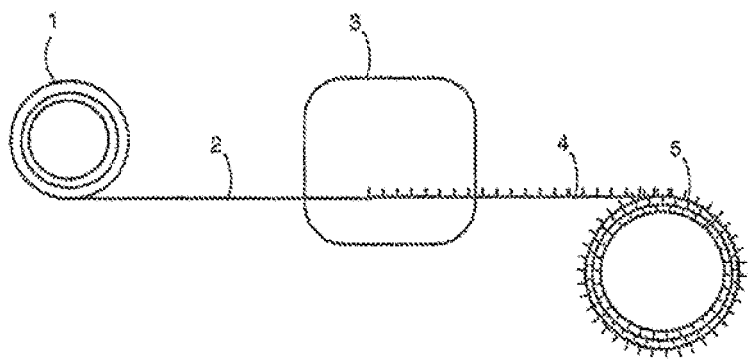
FIG. 1 shows a single-sided texturing process.

The process is shown in summary form in FIG. 1. A feed mechanism draws the material 2 from a self-wound coil 1 (or supply reel). The material is fed into an apparatus 3 for texturing. The apparatus uses knives (not shown) to impact the material and raise pointed structures on its surface. The material emerges from the apparatus now bearing pointed structures. This textured material 4 is then guided into a coil 5 (or onto a take-up reel).

Figure 2:
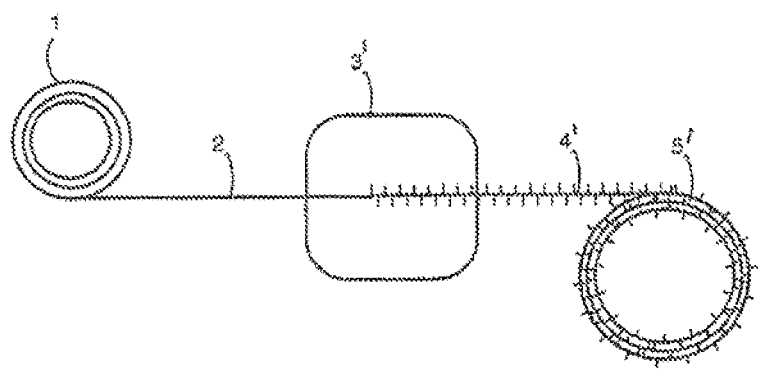
FIG. 2 shows a double-sided texturing process.

As shown in FIG. 2, the material 2 may also be textured on both sides A feed mechanism draws the material 2 from the self-wound coil 1 (or supply reel). The material is fed into a modified apparatus 3, that includes opposed impacting sections (knives disposed on both sides of the material—not shown). The material emerges from the apparatus now bearing pointed structures on both sides. This textured material 4 is then guided into a coil 5 (or onto a take-up reel).

Alternatively, a roll of single-sided textured material 4 may be run through the apparatus a second time to texture the opposing face using appropriate, support to protect the first face's pointed structures.

Figure 4:
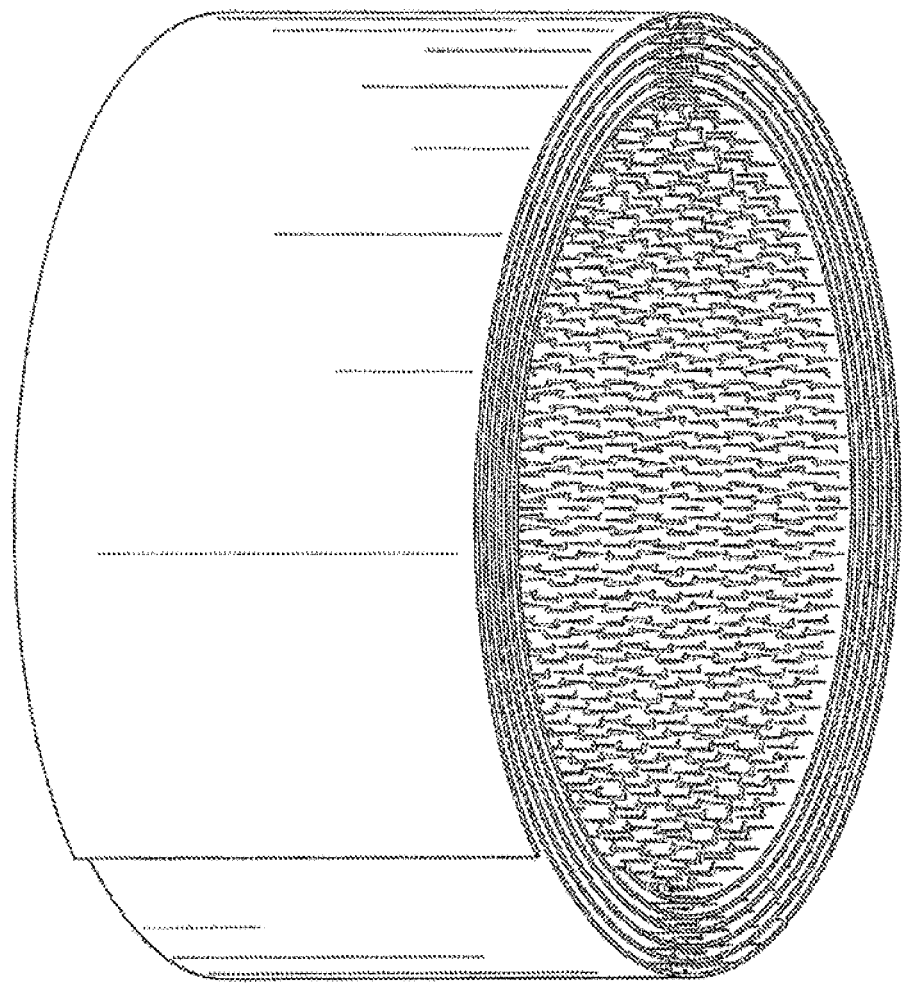
FIG. 4 shows a finished roll of bulk single-sided textured material sheeting.
Figure 5:
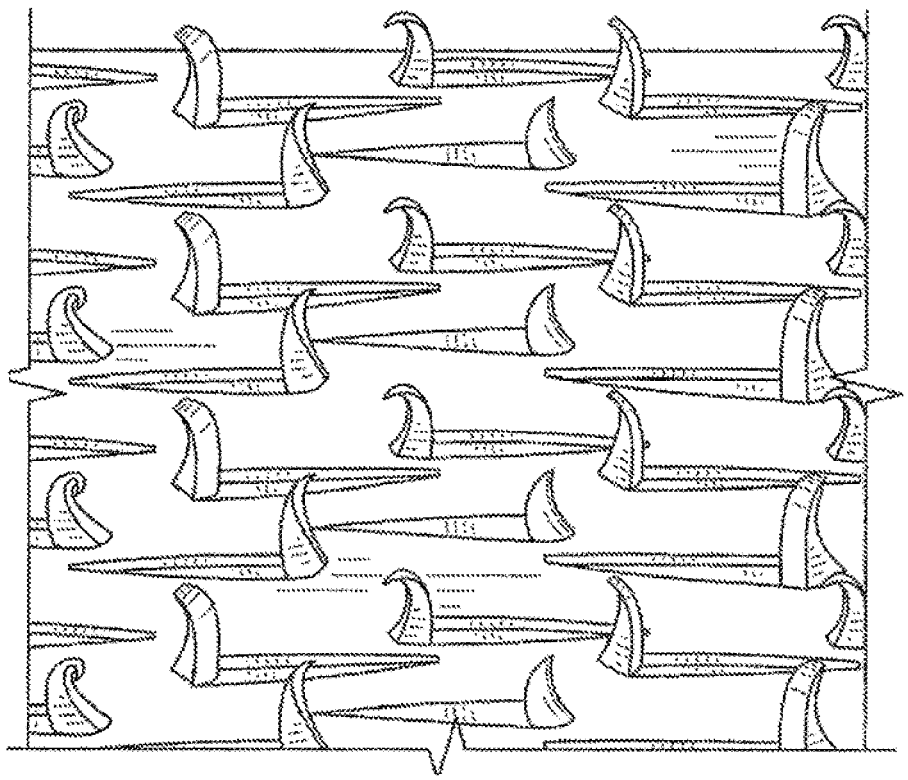
FIG. 5 shows a close-up of the texture of FIG. 3.

As shown in FIG. 5, the pointed structures may be in the form of hooks. Each hook is integrally formed from the material itself that is gouged or scraped up from the surface of the material by the impacting knives. The hooks are not punched through from the opposing side, so the underlying material is not punctured or perforated, but retains the integrity of its continuous body. Detail of the pointed structures (here, hooks) is shown in FIG. 4. The apparatus and tooling can be modified to form various shapes, dimensions and densities of hooks, depending on the material requirements and tolerances.

The knives of the apparatus are preferably in a pack with opposing knives being positioned offset from each other (i.e. an "A" set of knives and a "B" set of knives interleaved with each other in a pack, with the "A" set extended out to one side and the "B" set extended out to the other side). Side impacts from the apparatus force the "A" and "B" sets toward each other, so that the teeth of the knives gouge or scrape up hooks from the surface of the material.

Figure 3:
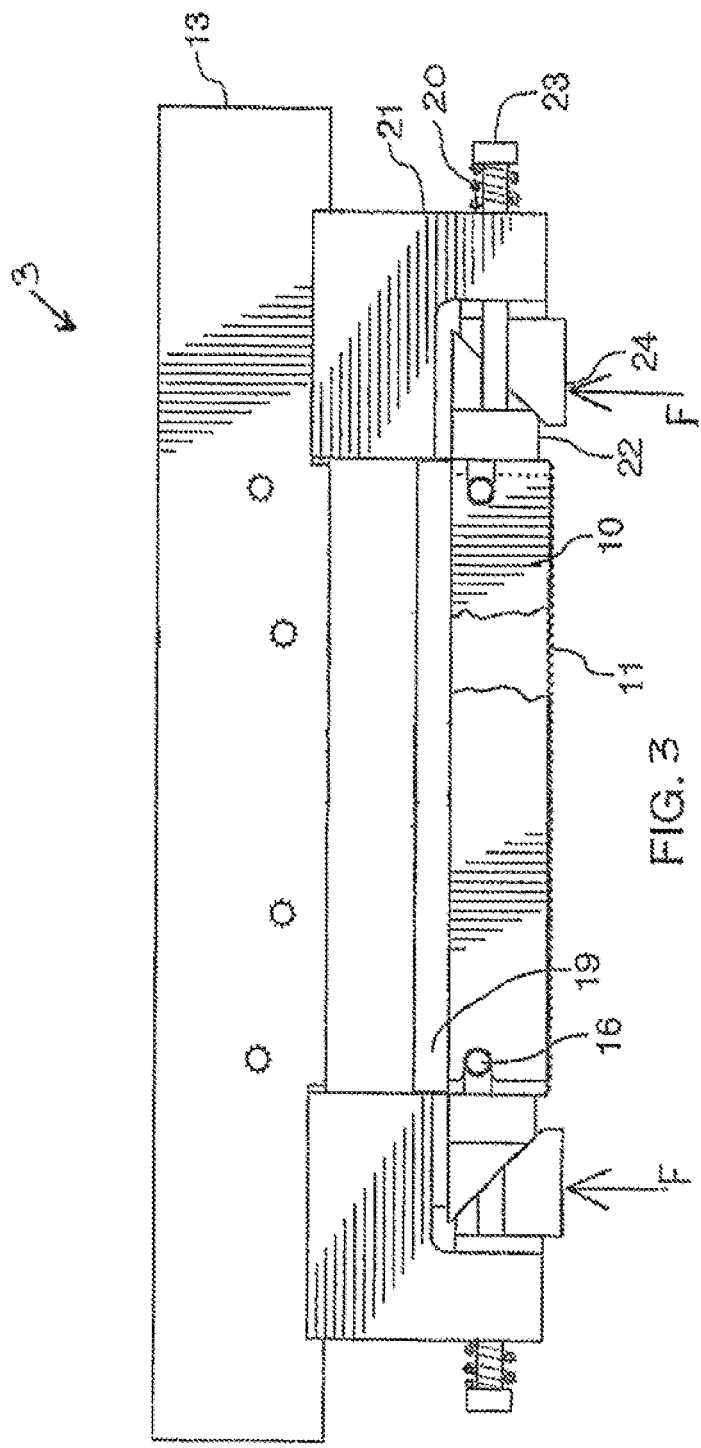
FIG. 3 shows a plan view of a sample apparatus used to provide single-sided texturing.

Various types of apparatus may be used to drive the knives and form the hooks. One useful embodiment uses a press to actuate the toothed knives generally into and across the surface of the material sheeting. As shown in FIG. 3, apparatus 3 includes an upper die plate 13 (this may be mounted in a press, or be part of a free standing assembly actuated by an independent press—as in CA 2,760,923, filed on Dec. 6, 2011, publication forthcoming). Transverse slide rods 16 are suspended from the apparatus and slide within slots in, the knives 10. Return springs (not shown) are connected to the slide rods to bias the slide rods toward each other. A pressure plate 19 is disposed above the knives. Two block housings 21 are mounted transversely on the upper die plate adjacent to the edges of the knives. A drive block 22 is mounted on each block housing by slide bolt 23, which is disposed substantially parallel to the longitudinal axis of the knives. A slide block 24 is slidably mounted in each housing adjacent to the drive block.

In operation, a press (not shown) drives upper die plate 13 of the apparatus 3 onto the material that has been fed into a material strike zone below knives 10. The force of the press causes the slide block 24 to impact the bottom surface of the press (not shown) before the knives 10 impact the surface of the material. The impact against the bottom surface of the material drives the slide block up relative to the drive block 22, causing the angled surface of 24 to exert a force on the drive block in a direction substantially parallel to the longitudinal axis of the knives. This force causes each drive block to move separate individual knives in the pack in opposing directions along their respective longitudinal axes. Because only alternate knives contact each drive block before impact, adjacent knives are pushed in opposite directions by each drive block Preferably, the knives are moving before contact with the material surface.

The teeth 11 of the knives are pushed down into the material, and the knives also slide along slide rods 16 parallel to their longitudinal axes. These simultaneous downward and sliding movements cause each tooth 11 of a knife to form one pointed structure (hook).

After the press lifts, the slide block 24 is returned to its starting position by compress springs 20, and the knives 10 and drive block 22 are returned to their starting positions by other springs (not shown). The knives are withdrawn from the material, which is then advanced by the feed mechanism (in a progression) to form another textured section.

FIGS. 4 and 5 show a possible embodiment of the textured material sheeting in finished form. As shown, the material may be coiled onto itself (or on a take-up reel) and sold as a bulk (mechanical-attachment-ready) material.

The finished material can be cut into specific products or combined with one or more heterogeneous materials in a double- or multi-ply laminate.

Material may also be directed to other downstream operations (e.g. stamping into shaped parts/strips/pieces, joining with one or more heterogeneous materials in a laminate, or other forming. The bulk material in one embodiment may be roll-formed or bent to take on a three-dimensional shape (e.g. cylindrical or other shaped tube).

Various ductile materials can be used with this process. Although metal sheeting is shown in FIGS. 4 and 5, the process has also be found to work on various harder plastics (Shore hardness of approximately D55 and up) and other materials in a range of widths and thicknesses. The sheeting can also be cooled or heated prior to impacting in order to make it more ductile or otherwise amenable to the texturing operation. For example, soft and rubbery materials (including those below the suggested Shore hardness of D55) may be cooled or frozen to apply this process.

Further, although the material may be selected, to retain and hold an upstanding pointed structure as taught and shown, there may also be advantages in processing material according to this method where the hooks do not stay raised, but collapse on themselves. The process may be advantageous simply for roughening or providing a disturbed surface on a material.

The foregoing description illustrates only certain preferred embodiments of the invention. The invention is not limited to the foregoing examples. That, is, persons skilled in the art will appreciate and understand that modifications and variations are, or will be, possible to utilize and carry out the teachings of the invention described herein. The scope of the claims should not be limited by the preferred embodiments set forth in the examples, but should be given the broadest purposive construction consistent with the description as a whole.

What is claimed is:

1. A material comprising:
    a metal sheet having first and second opposed sides, and a thickness between the first and second opposed sides;
    a first plurality of raised and pointed structures gouged out of the first side of the metal sheet, wherein the metal sheet is not perforated, and wherein the raised and pointed structures of the first plurality have a height of between 150% and 300% of the thickness; and
    a second plurality of the raised and pointed structures gouged cut of the second side of the metal sheet.

2. The material of claim 1, wherein the raised and pointed structures are arranged in a plurality of rows.

3. The material of claim 1, wherein the raised and pointed structures have a height of less than 0.0100 inches.

4. The material of claim 1, wherein the raised and pointed structures have a height of between 0.030 inches and 0.070 inches.

5. The material of claim 1, wherein the raised and pointed structures of the second plurality have a height of between 150% and 300% of the thickness.

6. The material of claim 1, wherein the raised and pointed structures have a hook shape.

7. The material of claim 1, wherein the metal sheet is in the form of a roll.

8. A material comprising:
    a n etaA sheet having first and second opposed sides, and a thickness between the first and second opposed sides;
    a first plurality of raised and pointed structures gouged out of the first side of the metal sheet, wherein the sheet is not perforated, and wherein the raised and pointed structures of the first plurality have a height of between 150% and 300% of the thickness, and wherein the metal sheet is in the form of a roll; and
    a second plurality of the raised and pointed structures gouged out of the second side of the metal sheet.

9. The material of claim 8, wherein the raised and pointed structures are arranged in a plurality of rows.

10. The material of claim 8, wherein the raised and pointed structures have a height of less than 0.0100 inches.

11. The material of claim 8, wherein the raised and pointed structures have a height of between 0.030 inches and 0.070 inches.

12. The material of claim 8, wherein the raised and pointed structures have a hook shape.

13. The material of claim 8, wherein the raised and pointed structures of the second plurality have a height of between 150% and 300% of the thickness.

* * * * *